US008370680B2

(12) United States Patent
Lee et al.

(10) Patent No.: US 8,370,680 B2
(45) Date of Patent: Feb. 5, 2013

(54) SOLID STATE STORAGE SYSTEM FOR CONTROLLING RESERVED AREA AND METHOD OF CONTROLLING THE SAME

(75) Inventors: Myung Suk Lee, Ichon-shi (KR); Jeong Soon Kwak, Ichon-si (KR); Kyeong Rho Kim, Ichon-shi (KR); Yang Gi Moon, Ichon-shi (KR)

(73) Assignee: SK Hynix Inc., Gyeonggi-do (KR)

( * ) Notice: Subject to any disclaimer, the term of this patent is extended or adjusted under 35 U.S.C. 154(b) by 284 days.

(21) Appl. No.: 12/839,325

(22) Filed: Jul. 19, 2010

(65) Prior Publication Data
US 2011/0161727 A1 Jun. 30, 2011

(30) Foreign Application Priority Data
Dec. 24, 2009 (KR) .................. 10-2009-0130753

(51) Int. Cl.
*G06F 11/00* (2006.01)
(52) U.S. Cl. ............... 714/6.13; 714/6.11; 714/6.12; 714/6.32; 714/710; 714/711
(58) Field of Classification Search ............. 714/6.11, 714/6.12, 6.13, 6.32, 710, 711
See application file for complete search history.

(56) References Cited

U.S. PATENT DOCUMENTS

| | | | |
|---|---|---|---|
| 6,493,302 B2 * | 12/2002 | Takahashi | 369/53.15 |
| 6,732,221 B2 | 5/2004 | Ban | |
| 6,985,992 B1 | 1/2006 | Chang et al. | |
| 7,392,457 B2 * | 6/2008 | Tamura et al. | 714/763 |
| 7,412,575 B2 * | 8/2008 | Park et al. | 711/159 |
| 7,603,584 B2 * | 10/2009 | Park et al. | 714/6.13 |
| 7,627,791 B2 * | 12/2009 | Winter et al. | 714/710 |
| 7,661,021 B2 * | 2/2010 | Hsueh et al. | 714/6.13 |
| 7,826,263 B2 * | 11/2010 | Lee et al. | 365/185.09 |
| 8,051,339 B2 * | 11/2011 | Sung et al. | 714/710 |
| 2005/0204187 A1 * | 9/2005 | Lee et al. | 714/8 |
| 2005/0204212 A1 * | 9/2005 | Noguchi et al. | 714/710 |
| 2007/0050536 A1 | 3/2007 | Kolokowsky | |
| 2008/0055989 A1 * | 3/2008 | Lee et al. | 365/185.09 |
| 2008/0162786 A1 | 7/2008 | Shanmuganathan | |
| 2008/0162796 A1 | 7/2008 | Chang et al. | |
| 2008/0229164 A1 * | 9/2008 | Tamura et al. | 714/721 |
| 2008/0282025 A1 | 11/2008 | Biswas et al. | |
| 2009/0077429 A1 | 3/2009 | Yim et al. | |
| 2009/0307525 A1 * | 12/2009 | Hiratsuka et al. | 714/8 |
| 2010/0017650 A1 * | 1/2010 | Chin et al. | 714/6 |
| 2010/0077132 A1 * | 3/2010 | Hung | 711/103 |
| 2011/0078496 A1 * | 3/2011 | Jeddeloh | 714/6.24 |
| 2011/0238900 A1 * | 9/2011 | Heo et al. | 711/103 |

FOREIGN PATENT DOCUMENTS

KR 1020000064279 A 11/2000

* cited by examiner

*Primary Examiner* — Joshua P Lottich
(74) *Attorney, Agent, or Firm* — William Park & Associates Ltd.

(57) ABSTRACT

A solid state storage system includes a flash memory region comprising a plurality of memory blocks and a plurality of replacement blocks corresponding to error-occurred blocks when errors occur in the memory blocks; and a memory controller configured to perform a control operation to replace the error-occurred blocks with the replacement blocks, wherein the error-occurred blocks comprise correctable blocks and uncorrectable blocks, and wherein the memory controller determines whether the error-occurred blocks are the correctable blocks or the uncorrectable blocks and controls zones of the replacement blocks, replaced in correspondence to the correctable blocks, to be allocated a plurality of times.

20 Claims, 3 Drawing Sheets

SOLID STATE STORAGE SYSTEM FOR CONTROLLING RESERVED AREA AND METHOD OF CONTROLLING THE SAME

CROSS-REFERENCES TO RELATED APPLICATION

The present application claims priority under 35 U.S.C. §119(a) to Korean Application No. 10-2009-0130753, filed on Dec. 24, 2009, in the Korean Intellectual Property Office, which is incorporated herein by reference in its entirety as if set forth in full.

BACKGROUND

1. Technical Field

The present invention relates to solid state storage systems and methods for controlling solid state storage systems, and more particularly, to a solid state storage system for flexibly controlling reserved areas and related method thereof.

2. Related Art

Nonvolatile memories are widely used as storage of various portable information terminals. Recently, SSDs (solid state drives) using NAND flash memory have begun to replace HDDs (hard disk drives) used for PCs (personal computers). It is anticipated that the SSD will make further inroads into the HDD market.

One of the problems occurring in using an SSD is a failed block problem. The failed block may be caused by processing defects of a flash memory or degradation of memory cells from frequent operations. The failed block needs to be replaced with a block in a reserved area so that the physical area of the failed block is not referenced again. To this end, a reserved area space is allocated. That is to say, a separate physical area is allocated and used solely for replacing a failed block.

SUMMARY

In one embodiment of the present invention, a solid state storage system comprises a flash memory region comprising a plurality of memory blocks and a plurality of replacement blocks corresponding to error-occurred blocks when errors occur in the memory blocks; and a memory controller configured to perform a control operation to replace the error-occurred blocks with the replacement blocks, wherein the error-occurred blocks comprise correctable blocks and uncorrectable blocks, and wherein the memory controller determines whether the error-occurred blocks are the correctable blocks or the uncorrectable blocks and controls zones of the replacement blocks, replaced in correspondence to the correctable blocks, to be allocated a plurality of times.

In another embodiment of the present invention, a method for controlling a solid state storage system comprises: determining whether error-occurred blocks are correctable blocks or uncorrectable blocks; allocating sequentially zones to blocks that correspond to logical addresses decreasing from a maximum value of logical addresses of replacement blocks when the error-occurred blocks belong to the uncorrectable blocks; and allocating sequentially zones to blocks that correspond to logical addresses increasing from a minimum value of the logical addresses of the replacement blocks when the error-occurred blocks belong to the correctable blocks.

In still another embodiment of the present invention, a storage device comprises: a memory region comprising at least one memory block and at least one replacement block that is used to replace the at least one memory block when an error occurs in the memory block; and a memory controller configured to perform a control operation to replace the at least one memory block with the at least one replacement block when the error occurs in the at least one memory block, wherein the memory controller determines whether the at least one memory block is a correctable block or an uncorrectable block, the correctable block being a block that is correctable through an error correction algorithm based on data in the at least one memory block and the uncorrectable block being a block that is not correctable through the error correction algorithm, and controls a relative location of the replacement block replacing the correctable block.

BRIEF DESCRIPTION OF THE DRAWINGS

Features, aspects, and embodiments are described in conjunction with the attached drawings, in which.

DETAILED DESCRIPTION

Figure 1:
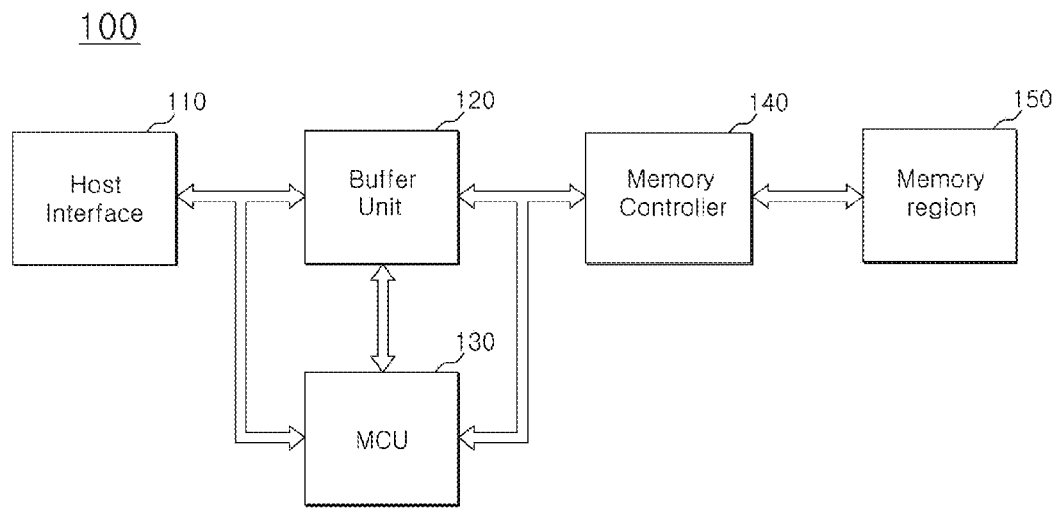
FIG. 1 is a block diagram illustrating a solid state storage system in accordance with one embodiment of the invention.

Reference will now be made in detail to the exemplary embodiments consistent with the present disclosure, examples of which are illustrated in the accompanying drawings. Whenever possible, the same reference numerals will be used throughout the drawings to refer to the same or like parts.

FIG. 1 is a block diagram illustrating a solid state storage system 100 in accordance with one embodiment of the invention. The solid state storage system 100 may include a NAND flash memory. Furthermore, the solid state storage system 100 may include a host interface 110, a buffer unit 120, an MCU (micro control unit) 130, a memory controller 140, and a memory region 150.

The host interface 110 may be connected to the buffer unit 120. The host interface 110 may be configured to transmit and receive control commands, address signals, and data signals between an external host (not shown) and the buffer unit 120. The interface scheme between the host interface 110 and the external host may be any one of, but not limited to, a serial ATA (serial advanced technology attachment: SATA), a parallel ATA (parallel advanced technology attachment: PATA), SCSI, Express Card, PCI-Express, etc.

The buffer unit 120 may be configured to buffer output signals from the host interface 110 or temporarily store mapping information between logical addresses and physical addresses, block allocation information of the memory region 150, and data received from outside the buffer unit 120. The buffer unit 120 may be a buffer that uses an SRAM (static random access memory).

The MCU 130 may be configured to transmit and receive the control commands, the address signals, and the data signals to and from the host interface 110 and control the memory controller 140 in response to such control commands, the address signals, and the data signals.

The memory controller 140 may be configured to select a specific NAND flash memory device among a plurality of NAND flash memory devices in the memory region 150 and provide program, erase, and read commands. In particular, the memory controller 140 may flexibly control the reserved area upon occurrence of a failed block.

A reserved area of a predetermined size is generally allocated in advance for respective blocks so as to cope with the occurrence of a failed block. Thus, the failed block may be replaced with a block in the reserved area and marked accordingly so that the failed block is not referred to again.

In the event that an error occurs during various operations on a data block (not shown), the memory controller 140 may perform a control operation so that not only a failed block but also a block having a high probability of failure may be replaced with a block in the reserved area. Here, the memory controller 140 may include an ECC engine (error check correction engine) (not shown). When an error occurs in a block while reading and programming data, the memory controller 140 may cause the ECC engine to correct the error. At this time, there may be a case in which an error-occurred block may be corrected by the ECC engine and a case in which the error-occurred block may not be corrected by the ECC engine. In the embodiment of the present invention, even when correction has already been made for both of these cases, certain portions of the reserved area may be allocated to replace the block.

Typically, the corresponding block is regarded as a failed block and is replaced with a block of a reserved area only when it is impossible to correct an error-occurred block through the ECC engine. When an occurred error can be corrected by the ECC engine, replacement is performed using a free block in a data area.

However, in the embodiment of the present invention, when errors occur during performance of read and program operations for data blocks, the memory controller 140 may perform the control operation such that all the error-occurred blocks are replaced with blocks in the reserved area. At this time, the memory controller 140 may allow the error-occurred blocks to be replaced with the blocks in the reserved area separately for both cases in which an error-occurred block may be corrected by the ECC and in which an error-occurred block may not be corrected by the ECC. In particular, the feasibility to reuse is considered for the blocks in the reserved area which have been replaced with corrections made, so that the resources of the reserved area may be fully utilized. This improves the utilization efficiency of the reserved area, as described in greater detail below.

The memory region 150 may be configured to be controlled by the memory controller 140 and may perform operations for programming, erasing, and reading data. Here, the memory region 150 may comprise a NAND flash memory. A cell of the NAND flash memory may be an SLC (single level cell) or an MLC (multi-level cell). The memory region 150 may include a plurality of chips. Each one of the plurality of chips may be composed of a plurality of blocks. Each one of the plurality of blocks may include a plurality of pages.

Figure 2:
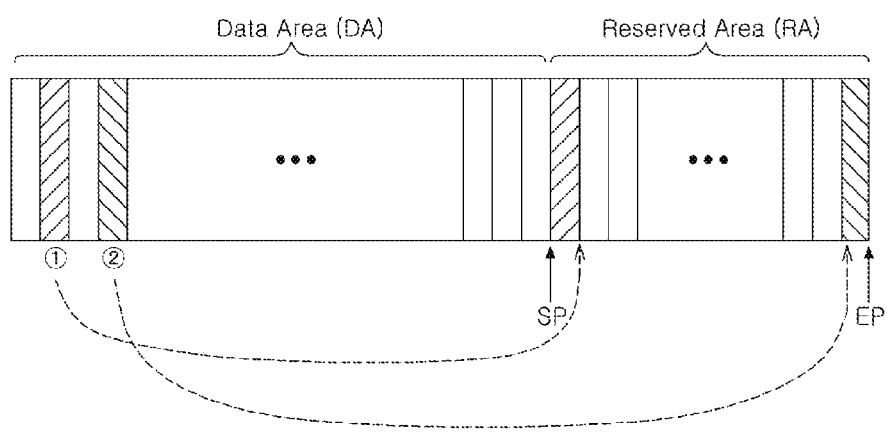
FIG. 2 is a diagram illustrating one embodiment of a data area and a reserved area in the solid state storage system shown in FIG. 1.

FIG. 2 is a diagram illustrating a data area DA and a reserved area RA in the solid state storage system shown in FIG. 1.

In FIG. 2, the data area DA may include a plurality of blocks with logical addresses. The reserved area RA may also include a plurality of blocks with logical addresses. The reserved area RA may use two identifiers (e.g., two pointers) such that the positions of the blocks in the reserved area RA may be located or calculated. The data area DA and the reserved area RA may have physical addresses that correspond to the logical addresses. Nevertheless, only the data area DA may become a subject of wear leveling, and the reserved area RA may not become a subject of wear leveling, even though the reserved area RA has the logical and physical addresses and serves as a subject of replacement since the addresses are used only for reference.

A start pointer SP with an initialized value may be allocated to a block with a minimum value among the logical addresses of the blocks allocated in the reserved area RA. In this case, as a logical address increases, the corresponding value of the start pointer SP also increases. For example, when a minimum value of logical addresses is 100, as a logical address increases to 101, 102 and 103, the start pointer SP is controlled to have a value that is increased to be greater than an initial value, for example, 0. The increasing range of the start pointer SP may vary without restriction. In other words, the value of the start pointer SP may be increased until it corresponds to a block that has a maximum value of the logical addresses, and may be limited by an end pointer EP.

The end pointer EP with an initialized value may be allocated to the block with the maximum value among the logical addresses of the logical blocks allocated in the reserved area RA. In contrast with the operation of the start pointer SP, the end pointer EP may be controlled such that, as the logical addresses of the blocks decrease, the corresponding values of the end pointer EP increase. For example, assuming that the maximum value of the logical addresses is 120, as a logical address decreases to 119, 118 and 117, the end pointer EP is controlled to have a value that is increased to be greater than an initial value, for example, 20. The increasing range of the end pointer EP may vary without restriction. In other words, the value of the end pointer EP may be increased until it corresponds to the block that has the minimum value of the logical addresses, and may be limited by the start pointer SP.

Of course, it may be preferred that the initial values of the start pointer SP and the end pointer EP are different from each other in order to avoid confusion. Since the end pointer EP and the start pointer SP are set to identify the positional information of the corresponding logical blocks, the initial values of the pointers themselves are not important. As a consequence, without additional mapping information for the reserved area, the positional information of the logical blocks in the reserved area RA may be simply provided by using the start pointer SP and the end pointer EP.

Describing a read mode operation in detail with reference to FIG. 2, if an error occurs in the data area DA (see (1)), correction may be attempted using the ECC. If the error-occurred block is corrected, the corresponding block may be regarded as a correctable block, and replacement may be performed by allocating a specified block in the reserved area RA. According to one embodiment, if the error-occurred block is a correctable block, the specified block in the reserved area RA may be allocated using the start pointer SP. When exemplifying the start pointer SP using the decimal system, the start pointer SP may be increased by 1 in decimal. For example, if the initial value of the start pointer SP is 0, every time when a correctable block is replaced, the start pointer SP may have a gradually increased pointer value such as 1, 2, 3, . . . .

Assuming that an error occurs in the data area DA during a read mode (see (2)) and correction is attempted using the ECC, if it is impossible to correct a block since it exceeds a correctable bit number, the block may be determined as a failed block, and replacement may be made by allocating a specified block in the reserved area RA. If the error-occurred block is a block which cannot be corrected, the specified block in the reserved area RA may be allocated using the end pointer EP. Thereafter, when exemplifying the end pointer EP using the decimal system, the end pointer EP may be increased by 1 in decimal. For example, when the initial value of the end pointer EP is 20, the end pointer EP may have a gradually increased pointer value such as 21, 22, 23, . . . .

In the embodiment of the present invention, a correctable block may be called a warning block to signify a block that has a high probability of an error occurring. An uncorrectable block may be called a critical block to signify a block that cannot be recovered.

In this way, the reserved area RA may be controlled by being divided into replacement blocks for correctable blocks and replacement blocks for uncorrectable blocks, using the start pointer SP and the end pointer EP. Since these pointers may be variably updated based on error-occurred blocks, they may not be controlled as fixed blocks, whereby flexibility may be improved in terms of utilization efficiency of the reserved area RA.

Figure 3:
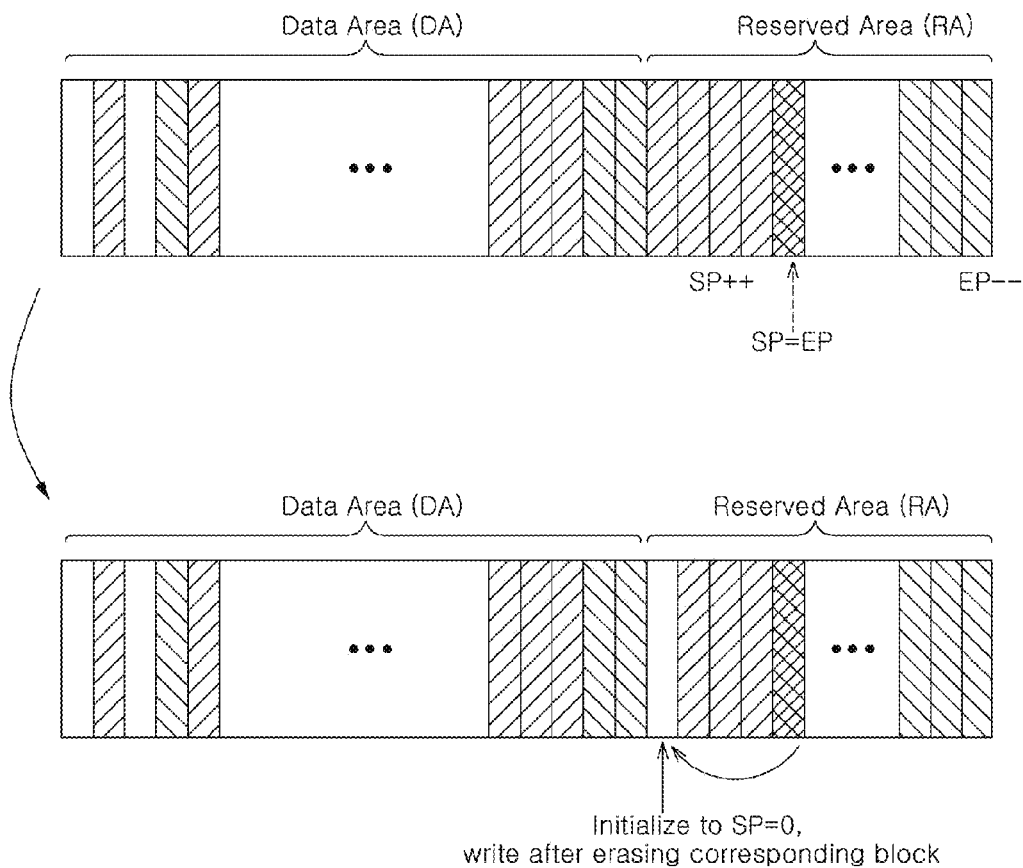
FIG. 3 is a diagram for illustrating the case when a start pointer and an end pointer in a reserved area correspond to each other in the solid state storage system shown in FIGS. 1 and 2.

FIG. 3 is a diagram for illustrating the case when the start pointer SP and the end pointer EP defining the warning block and the critical block in the reserved area RA are the same in the solid state to storage system shown in FIGS. 1 and 2.

Referring to FIG. 3, it is exemplarily illustrated that since the data area DA has a multitude of error-occurred blocks, not only the number of correctable blocks increases but also the number of uncorrectable blocks increases. FIG. 3 illustrates when the logical block designated by the start pointer SP capable of defining the replacement areas of correctable blocks and the logical block designated by the end pointer EP capable of defining the replacement areas of the uncorrectable blocks may be substantially the same.

In this regard, when the logical blocks designated by the start pointer SP and the end pointer EP are the same, the memory controller 140 (see FIG. 1) may initialize the start pointer SP and then perform a control operation so that the logical block in the reserved area RA, designated by the initialized start pointer SP, becomes a replacement block. Namely, replacement may be performed by designating the block having the minimum value of the logical address that corresponds to the initialized start pointer SP, as the replacement block.

In order to program data to a new block, an erasing operation should be conducted prior to a programming operation. Therefore, after erasing the contents of the designated replacement block, the data of the error-occurred block may be written to the replacement block for which the erasing operation is performed and error checking may be performed.

Meanwhile, due to the characteristics of flash memory, if the reading operation is repeatedly performed, a voltage may temporarily rise over a specified voltage. Therefore, an error may be caused not because of a defect of a flash memory cell but because of a read disturbance. Accordingly, if the error is not caused by a defect of the cell but due to a read disturbance, when the erasing operation is performed for the corresponding memory cell, the voltage may be restored to a normal level so that the corresponding memory cell may operate like a normal cell.

Figure 4:
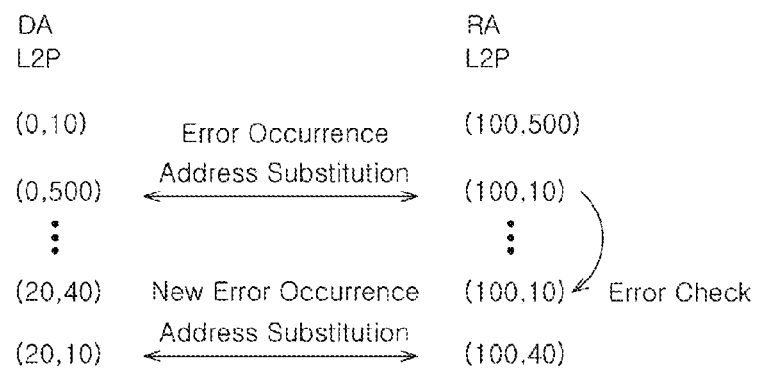
FIG. 4 is a diagram illustrating the relationship between the data area and the reserved area in one embodiment of an address mapping table.

FIG. 4 is a diagram illustrating the relationship between the data area DA and the reserved area RA in one embodiment of an address mapping table. If the logical address mapping table of an error-occurred block, a data area DA, is (0, 10) and a warning block determined to be correctable is replaced with a logical address mapping table (100, 500) of a reserved area RA, the logical address mapping table of the corresponding error-occurred block may be replaced with (0, 500) and the logical address mapping table of the reserved area RA may be replaced with (100, 10). At this time, the actually replaced physical address 10 of the reserved area RA may store error-occurred data.

Then, the reserved area RA may be successively allocated by increasing the start pointer SP for correctable blocks. While it may be necessary to allocate a new block for a new error-occurred block (20, 40) using the start pointer SP, if the logical blocks designated by the start pointer SP and the end pointer EP are the same, the start pointer SP may be initialized. This means that the start pointer SP may be returned to correspond to the block corresponding to the logical address having the minimum value.

Thus, the logical address mapping table (100, 10) of the reserved area RA may be reallocated by the initialized start pointer SP. Garbage data corresponding to the logical address mapping table (0, 10) of the data area DA may have already been stored in the mapping table (100, 10) of the reserved area RA. At once, the new error-occurred block (20, 40) may be copied to the logical address mapping table (100, 10) of the reserved area RA, and error checking is performed. If an error does not occur, since the new error-occurred block (20, 40) may be replaced with the logical address mapping table (100, 10) of the reserved area RA, address substitution may be performed so that the address mapping table of the data area DA becomes (20, 10) and the address mapping table of the reserved area RA becomes (100, 40). If an error occurs when the address mapping table (20, 40) of the data area DA is copied to the mapping table (100, 10) of the reserved area RA and then error checking is performed, the mapping table (20, 40) of the data area DA may be processed as a critical failed block and may be allocated through increasing the current end pointer EP.

In this way, even the block replaced in correspondence to the correctable block may be reused after being erased. However, in the case where there is no remaining block after blocks are allocated for correctable blocks, a replacement block for a correctable block may be allocated again starting from the block having the minimum value of the logical address among the blocks that are replaced in correspondence to the correctable blocks. In the course of erasing a reallocated block, if the voltages of the cells of the corresponding block are restored to normal levels, the corresponding block may be used as a replacement block for a new error-occurred block. However, if an error occurs when the corresponding block is used as the replacement block for the correctable block after erasing, the correctable block is skipped and is replaced with a block corresponding to the pointer value that is obtained by increasing the current end pointer EP by 1, and is controlled as an uncorrectable block, that is, a critical block.

Figure 5:
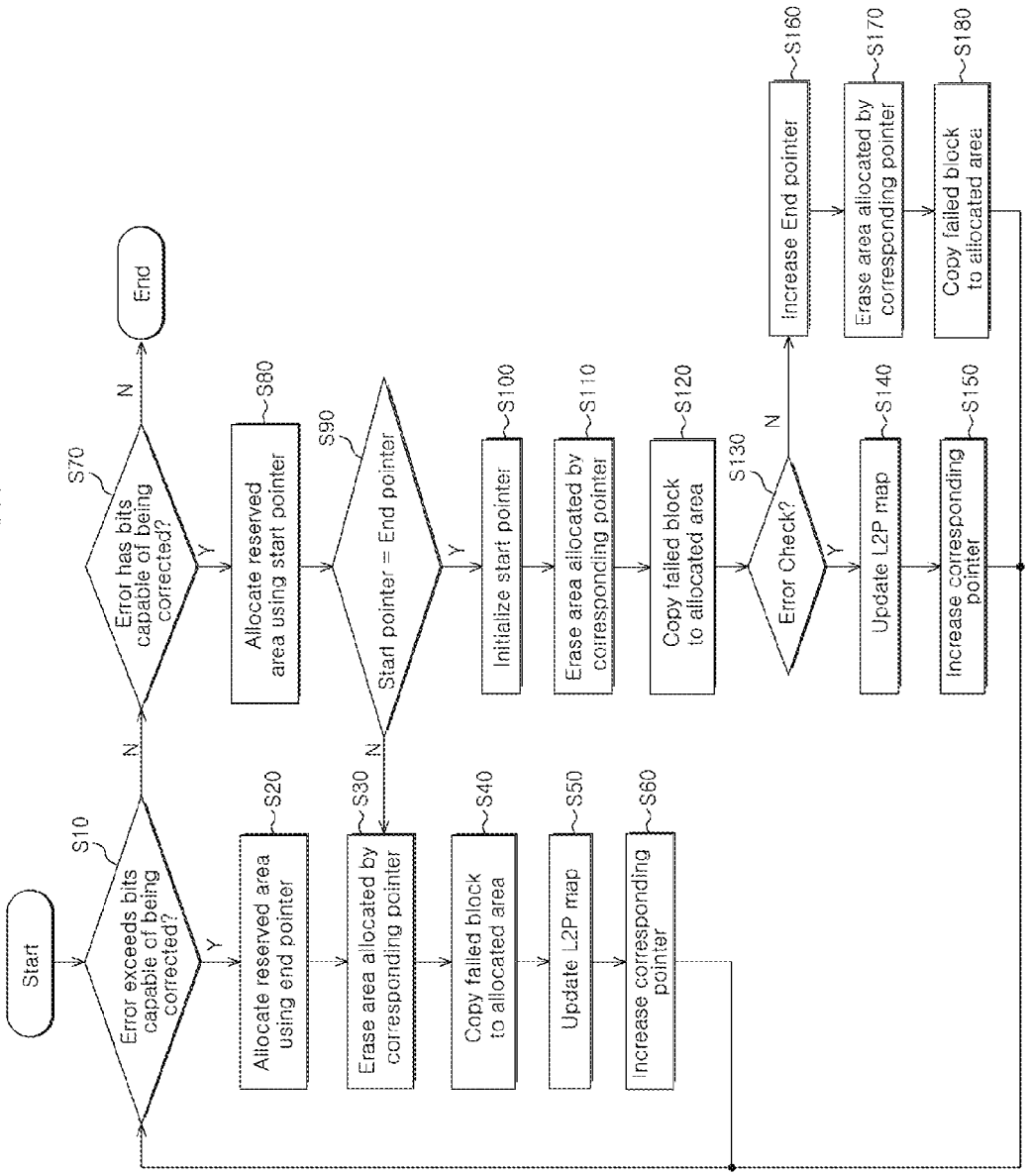
FIG. 5 is a flow chart illustrating a method for controlling a solid state storage system in accordance with one embodiment of the invention.

FIG. 5 is a flow chart illustrating a method for controlling the solid state storage system as shown in FIG. 1, in accordance with one embodiment of the invention. When an error occurs in the data area DA, whether or not the error belongs to an error that exceeds bits capable of being corrected bits may be determined (S10).

If the error belongs to the error that exceeds the correctable bits (Y), a corresponding block may be regarded as a critical block and the reserved area RA is allocated using the end pointer EP of the reserved area RA (S20). After erasing the area allocated by the end pointer EP as the corresponding pointer (S30), the error-occurred block may be copied to the allocated area (S40). The address map of the error-occurred block may be updated (S50) by changing the physical address of the error-occurred block to the physical address of a specified block in the reserved area RA. Thereafter, the end pointer EP may be increased (S60).

If the error does not belong to an error that exceeds correctable bits (N) but belongs to an error that is within the correctable bits (Y), the corresponding block may be regarded as the warning block (S70), and the reserved area RA may be allocated using the start pointer SP of the reserved area RA (S80).

In succession, it may be determined whether or not the block, to which the reserved area RA is allocated using the start pointer SP of the reserved area RA, may be the block that corresponds to the end pointer EP (S90).

If the block corresponding to the start pointer SP and the block corresponding to the end pointer EP are not the same, the area allocated by the start pointer SP as the corresponding pointer is erased (S30), and the error-occurred block is copied to the allocated area (S40). The address map of the error-occurred block may be updated (S50). Thereafter, the start pointer SP may be increased (S60).

If the error does not belong to an error that exceeds correctable bits (N) and does not belong to an error that is within the correctable bits (N), since no error-occurred block is associated, the method may end.

It may be determined whether or not the block, to which the reserved area RA is allocated using the start pointer SP of the reserved area RA, is the block that corresponds to the end pointer EP (S90). If the block corresponding to the start pointer SP and the block corresponding to the end pointer EP are the same, the start pointer SP may be initialized (S100). Thus, in the reserved area RA, the block having the logical address of the minimum value and corresponding to the initialized start pointer SP may be associated.

Next, the area allocated by the start pointer SP as the corresponding pointer may be erased (S110). Thereafter, the error-occurred block may be copied to the allocated area (S120). At this time, since the block is reused, an error check may occur to determine whether an error occurs in the replaced block (S130).

If an error does not occur, the address mapping table may be updated (S140) and the start pointer SP may be increased by 1 from the initialized value (S150).

For the block to be reused, an error check may occur to determine whether an error occurs in the replaced block (S130). If an error occurs, the end pointer EP may be increased (S160).

The area allocated by the end pointer EP as the corresponding pointer may be erased (S170). Thereafter, the error-occurred block may be copied to the allocated area (S180).

As is apparent from the above description, in the present invention, a reserved area may be controlled in a way so that it may be reused. The reserved area may be used not only for replacing a failed block but also for replacing a warning block having a high probability of a failure occurring. In other words, for a block that replaces the warning block, if cell voltages are restored to normal states through an erasing process, the block may be reused. Since the blocks in the reserved area may be simply selected and used for replacement using a plurality of pointers, the control of a solid state storage system may be easily implemented.

While certain embodiments have been described above with reference to illustrative examples for particular applications, it will be understood to those skilled in the art that the embodiments described are by way of example only. Those skilled in the art with access to the teachings provided in this disclosure will recognize additional modifications, applications, and/or embodiments and additional fields in which the present disclosure would be of significant utility. Accordingly, the solid state storage system and the controlling method thereof described herein should not be limited based on the described embodiments. Rather, the solid state storage system and the controlling method thereof described herein should only be limited in light of the claims that follow when taken in conjunction with the above description and accompanying drawings.

What is claimed is:

1. A solid state storage system comprising:
a flash memory region comprising a plurality of memory blocks and a plurality of replacement blocks corresponding to error-occurred blocks when errors occur in the memory blocks; and
a memory controller configured to perform a control operation to replace the error-occurred blocks with the replacement blocks,
wherein the error-occurred blocks comprise correctable blocks and uncorrectable blocks, and
wherein the memory controller determines whether the error-occurred blocks are the correctable blocks or the uncorrectable blocks and controls zones of the replacement blocks, replaced in correspondence to the correctable blocks, to be allocated a plurality of times.

2. The solid state storage system according to claim 1, wherein the memory controller establishes a plurality of pointers to separately control the zones of the replacement blocks by dividing the zones of the replacement blocks into zones to be replaced in correspondence to the correctable blocks and zones to be replaced in correspondence to the uncorrectable blocks.

3. The solid state storage system according to claim 2, wherein the plurality of pointers comprise:
a start pointer with a value that increases as a minimum value of logical addresses of the replacement blocks increases; and
an end pointer with a value that increases as a maximum value of the logical addresses of the replacement blocks decreases.

4. The solid state storage system according to claim 3, wherein, if the error-occurred blocks belong to the correctable blocks, replacement is made by allocating zones using the start pointer.

5. The solid state storage system according to claim 3, wherein, if the error-occurred blocks belong to the uncorrectable blocks, replacement is made by allocating zones using the end pointer.

6. The solid state storage system according to claim 3, wherein, when logical blocks designated by the start pointer and logical blocks designated by the end pointer are the same, the memory controller initializes the start pointer.

7. The solid state storage system according to claim 6, wherein the memory controller controls initialization of the start pointer for a logical block designated by the start pointer to correspond to a block with the minimum value of the logical addresses of the replacement blocks.

8. The solid state storage system according to claim 6, wherein, when logical blocks designated by the start pointer and logical blocks designated by the end pointer for a new correctable block are the same, the memory controller reallocates a logical block previously allocated by the start pointer.

9. A method for controlling a solid state storage system, comprising:
determining whether error-occurred blocks are correctable blocks or uncorrectable blocks;

allocating sequentially zones to blocks that correspond to logical addresses decreasing from a maximum value of logical addresses of replacement blocks when the error-occurred blocks belong to the uncorrectable blocks; and allocating sequentially zones to blocks that correspond to logical addresses increasing from a minimum value of the logical addresses of the replacement blocks when the error-occurred blocks belong to the correctable blocks.

10. The method according to claim 9, wherein, when the error-occurred blocks belong to the uncorrectable blocks, a value of an end pointer is increased as a value of a logical address decreases from the maximum value of the logical addresses of the replacement blocks.

11. The method according to claim 9, wherein, when the error-occurred blocks belong to the correctable blocks, a value of a start pointer is increased as a value of a logical address increases from the minimum value of the logical addresses of the replacement blocks.

12. The method according to claim 11, wherein, when no zone for a new error-occurred block remains in the correctable blocks or in the replacement blocks, the start pointer is initialized.

13. The method according to claim 12, wherein, when no zone remains in the replacement blocks, logical blocks designated by the start pointer and the end pointer are the same.

14. The method according to claim 12, wherein initialization of the start pointer is controlled for a logical block designated by the start pointer to correspond to a block with the minimum value of the logical addresses of the replacement blocks.

15. The method according to claim 14, further comprising error checking after reallocating the block corresponding to the minimum value of the logical addresses and replacing the replacement block for the correctable block with the reallocated block.

16. The method according to claim 15, wherein, if an error occurs after the error checking, replacement is made by allocating a logical block that is designated by increasing a current value of the end pointer.

17. A storage device comprising:

a memory region comprising at least one memory block and at least one replacement block that is used to replace the at least one memory block when an error occurs in the memory block; and a memory controller configured to perform a control operation to replace the at least one memory block with the at least one replacement block when the error occurs in the at least one memory block, wherein the memory controller determines whether the at least one memory block is a correctable block or an uncorrectable block, the correctable block being a block that is correctable through an error correction algorithm based on data in the at least one memory block and the uncorrectable block being a block that is not correctable through the error correction algorithm, and controls a relative location of the replacement block replacing the correctable block, and wherein the memory controller establishes a plurality of pointers to separately control the location of the replacement block.

18. The storage device according to claim 17, wherein the plurality of pointers comprise:

a start pointer with a value that increases as a minimum value of logical addresses of the at least one replacement block increases; and an end pointer with a value that increases as a maximum value of the logical addresses of the at least one replacement block decreases.

19. The storage device according to claim 18, wherein, if the error-occurred block is the correctable block, replacement is made by identifying the location of the at least one replacement block using the start pointer.

20. The storage device according to claim 18, wherein, if the error-occurred block is the uncorrectable block, replacement is made by identifying the location of the at least one replacement block using the end pointer.

\* \* \* \* \*